(12) United States Patent
Elfström (10) Patent No.: US 9,031,528 B2
(45) Date of Patent: May 12, 2015

(54) RADIO INTERFERENCE TESTING FOR MULTI RADIO DEVICES

(75) Inventor: Torbjörn Elfström, Fjärås (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 249 days.

(21) Appl. No.: 13/301,370

(22) Filed: Nov. 21, 2011

(65) Prior Publication Data

US 2013/0122842 A1 May 16, 2013

Related U.S. Application Data

(63) Continuation of application No. PCT/EP2011/070252, filed on Nov. 16, 2011.

(51) Int. Cl.
*H04B 1/10* (2006.01)
*H04B 17/00* (2006.01)

(52) U.S. Cl.
CPC .......... *H04B 17/0062* (2013.01); *H04B 17/005* (2013.01)

(58) Field of Classification Search
CPC ............. H04B 17/005; H04B 17/0062; H04B 12/0008; H04W 24/02; H04W 72/1215; H04W 71/1231
USPC ................................ 455/67.11, 310, 296, 298
See application file for complete search history.

(56) References Cited

U.S. PATENT DOCUMENTS

| | | | | |
|---|---|---|---|---|
| 5,630,224 A | * | 5/1997 | Swail | 455/296 |
| 5,765,113 A | * | 6/1998 | Russo et al. | 455/557 |
| 2002/0042687 A1 | * | 4/2002 | Tracy et al. | 702/119 |
| 2006/0018401 A1 | * | 1/2006 | Rush et al. | 375/296 |

(Continued)

FOREIGN PATENT DOCUMENTS

| | | |
|---|---|---|
| EP | 0825734 A2 | 2/1998 |
| EP | 1675287 A1 * | 6/2006 |

OTHER PUBLICATIONS

"Bluetest SE, Testing Communication System, Performance in Reverberation Chamber, White Paper; BTW-002 Rev A, www.bluetest.se", downloaded from the Internet on Nov. 23, 2011, www.bluetest.se.

(Continued)

*Primary Examiner* — Wesley Kim
*Assistant Examiner* — Devan Sandiford
(74) *Attorney, Agent, or Firm* — Christopher & Weisberg, P.A.

(57) ABSTRACT

A method for testing radio properties of a module in a platform. The module has at least one element, and the platform has at least one element in which an element includes a receiver. The method includes importing an identification of a plurality of elements and an identification of elements having receivers which are capable of measuring and communicating radio parameters. For each identified receiver, the receiver is enabled and a radio parameter measurement is performed and stored in which other identified elements are disabled for a reference level measurement. For each other identified element different from the identified receiver, a further radio parameter measurement is taken and stored for which the other element different from the identified receiver is enabled for a disturbance level measurement of the given other enabled element with respect to the identified enabled receiver.

21 Claims, 7 Drawing Sheets

(56) References Cited

U.S. PATENT DOCUMENTS

| | | | |
|---|---|---|---|
| 2006/0019686 A1* | 1/2006 | Rush et al. | 455/501 |
| 2007/0061535 A1* | 3/2007 | Xu et al. | 711/167 |
| 2007/0105501 A1 | 5/2007 | Shen et al. | |
| 2008/0119140 A1* | 5/2008 | Maligeorgos et al. | 455/67.13 |
| 2009/0003294 A1 | 1/2009 | Zhu et al. | |
| 2009/0197591 A1* | 8/2009 | Rolf et al. | 455/425 |
| 2009/0233569 A1 | 9/2009 | Wakutsu | |
| 2009/0318103 A1* | 12/2009 | Feenaghty et al. | 455/226.3 |
| 2010/0197235 A1 | 8/2010 | Wilhelmsson | |
| 2010/0265999 A1* | 10/2010 | Stern et al. | 375/219 |
| 2011/0055434 A1* | 3/2011 | Pyers et al. | 710/14 |
| 2011/0090982 A1* | 4/2011 | Chen et al. | 375/285 |
| 2011/0143693 A1 | 6/2011 | Masaki | |
| 2011/0237188 A1* | 9/2011 | Sen | 455/41.2 |
| 2011/0267951 A1* | 11/2011 | Stanwood et al. | 370/235 |
| 2012/0178386 A1* | 7/2012 | Pascolini et al. | 455/84 |
| 2012/0207194 A1* | 8/2012 | Stang et al. | 375/219 |

OTHER PUBLICATIONS

International Search Report and Written Opinion dated May 18, 2012 for International Application Serial No. PCT/EP2011/070252, International Filing Date: Nov. 16, 2011 consisting of 13-pages.

* cited by examiner

RADIO INTERFERENCE TESTING FOR MULTI RADIO DEVICES

CROSS-REFERENCE TO RELATED APPLICATION

This application is a continuation of International Application Serial No. PCT/EP2011/070252, filed Nov. 16, 2011, entitled RADIO INTERFERENCE TESTING FOR MULTI RADIO DEVICES, the entirety of which is incorporated herein by reference.

STATEMENT REGARDING FEDERALLY SPONSORED RESEARCH OR DEVELOPMENT n/a

FIELD OF THE INVENTION

This invention relates to a method for testing radio modules which are designed for being operational in platforms. More particularly, the invention relates to an automated method for testing radio modules in various platforms for in-band self interference as well as to such modules themselves.

BACKGROUND OF THE INVENTION

Radio frequency interference, RFI, performance is essential for achieving desired radio performance defined in standardization bodies such as 3GPP and IEEE.

Integrating radio based systems into consumer electronics requires simple and fast methods to evaluate self generated radio frequency interference (RFI). Radio technologies such as WLAN (Wireless Local Area Network), WWAN (Wireless Wide Area Network) and GNSS (Global Navigation Satellite System) will be included in all kinds of devices, such as phones, notebooks, tablets, gaming consoles and a wide range of machine-to-machine (M2M) devices.

When several radio systems are integrated in one device they will interfere with each other by generating spurious emission. If RFI originated noise falls within a victim receiver bandwidth the BER (Bit error Rate) performance will be degraded, resulting in less effective throughput or other negative effects.

A modern notebook comprises several modules—or components—such as display, host, hard drive, WLAN and WWAN. For radio access system modules a self contained form factor is used with a standardized mechanical and electrical interface.

Radio devices are often realized in PCI (Peripheral Controller Interface) Express mini-card form factor mounted in a slot connector at the host. Modules can also be soldered directly on the printed circuit board (PCB) or placed as a sub-PCB connected to the host via cable. The above mentioned form factors make it simple to add extended functionality to a specific model at a low cost.

However, the design phase for consumer electronics is usually limited. Typically, a device uses standard components mounted in a limited space. Each component should fulfill specified radio performance requirements for the specific component. When several components are located closely often using shared antennas they will interfere with each other. The noise is generated from sharp clock edges, out-of band spurious emissions from co-located radios and harmonics from different clock sources. Also out-of band spurious emission from co-located radios will add in-band noise within the receiver bandwidth of a given receiver. Harmonics from clock sources and RF carrier signals are also potential sources of self interference. Micro processors, random access memories and high speed bus controllers—to name a few—are typical components generating radio interference. The noise level from these types of devices is not static. They may for instance vary as a function of processor load and memory access capacity, distance to WWAN base station.

Figure 1:
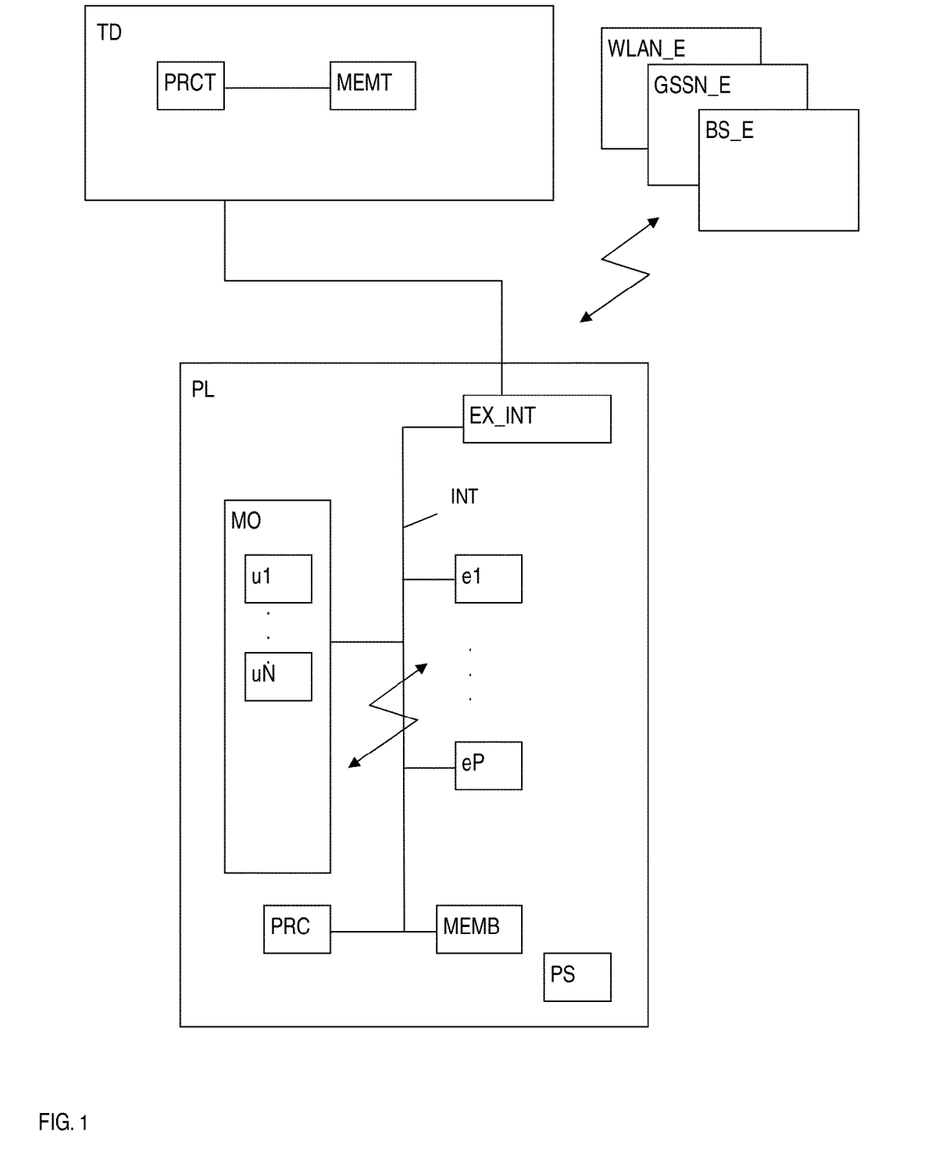
FIG. 1 shows a reference apparatus for performing RFI evaluation.

The self generated interference level is measured for each radio sub-system based on typical use-cases. Special test equipment can be utilized to evaluate the performance degradation. In such a test, a signal emulator (e.g. Base-Station emulator) may used as signal source for the victim receiver as shown in FIG. 1.

For OTA (Over The Air) testing, anechoic chambers is required by several standard bodies such as CTIA and 3GPP for measurement of TRP (Total Radiated Power) and TRS (Total Radiated Sensitivity).

A reverberation chamber test equipment for evaluating performance degradation is known according to "Bluetest SE, Testing communication System, Performance in reverberation chamber, White paper; BTW-002 Rev A, www.bluetest.se", downloaded from the Internet on 2011-10-25—http://www.bluetest.se/download/BTW-002_System_test_in_RC_A.pdf. The reverberation chamber constitutes an alternative to the anechoic chamber.

To be able to reduce the time to market, it is desirable to have an arrangement for the cost effective testing of RFI and in particular for an evaluation of self generated RFI.

SUMMARY OF THE INVENTION

The invention provides a method for testing RFI. There is provided, a method for testing radio properties of at least a module in a platform, wherein, the module includes one or more elements. The platform includes one or more elements in which an element may have a receiver. Each element potentially being susceptible to interference from the one or more other elements. Each element is potentially susceptible to interference from the one or more other elements. The method includes importing an identification of a plurality of elements and an identification of elements having receivers which are capable of measuring and communicating radio parameters. For each identified receiver, the received is enabled and a radio parameter measurement is performed and stored in which other identified elements are disabled for a reference level measurement. For each other identified element different from the identified receiver, a further radio parameter measurement is taken and stored for which the other element different from the identified receiver is enabled for a disturbance level measurement of the given other enabled element with respect to the identified enabled receiver.

In another embodiment a computer program product for cost effectively testing for RFI is provided. There is hence provided a computer program product for testing radio properties of a radio module in a platform having a processor, wherein, the module includes a plurality of elements, and the platform has one or more elements. A given element may include a receiver, which is potentially susceptible to interference from the one or more other elements. The computer program product, when executed by a processor is adapted to import an identification of a plurality of elements and an identification of elements which have receivers which are capable of measuring and communicating radio parameters. For each identified receiver, the receiver is enabled and a radio parameter measurement is taken and stored in which other identified elements are disabled for a reference level measurement. For each other identified element different from the identified receiver, a further radio parameter measurement is taken and stored for which the other element different from the identified receiver is enabled for a disturbance level measurement of the given other enabled element with respect to the identified enabled receiver.

In another embodiment a module for cost effectively testing for RFI is provided. The module for a platform is hence provided in which the platform includes a plurality of elements of which at least one element is a receiver. The module is adapted to be inserted in a platform. The module includes a local memory, a local power supply and a self interference controller. The self interference controller is adapted to:

identify a host supporting the processor and the memory in which the instruction set is stored;
enable a receiver in the module;
put the host in sleep mode;
disable other identified elements than the enabled receiver; and
measure and store a radio parameter of the receiver in a local memory associated with the receiver or with a module supporting the receiver for a reference measurement pertaining to the enabled receiver.

The method and computer program product according to the invention may be used in the design integration phase and in the manufacturing test phase. Such tests may also be used in a conformance and a certification phase. The method according to the invention can easily be scaled to comply with a large amount of product combinations, for instance with respect to testing a module in a large amount of platforms in order to reduce the overall cost. When a RFI issue is discovered according to tests, mitigation can be initiated for solving the RFI problem.

The present invention allows for a cost effective evaluation of the RFI environment for a multitude of different product configurations. Further advantages of the invention will appear from the following detailed description of the invention.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

In FIG. 1, a reference test apparatus TD for evaluating RFI of an apparatus under test, also denoted platform PL is shown. The test apparatus could be a standard PC having processor PRCT and memory means, MEMT.

The platform PL includes a plurality of elements, e1-eP, and an internal interface INT. The elements could include screen and keyboard or as a touch sensitive screen without keyboard. The platform may be implemented on a printed circuit board or other form for substrate. The platform could be build around one or several circuit boards within an encapsulation. The interface is moreover coupled to a memory MEMB and a processor PRC also included in the platform. The interface may be a PCIe (Peripheral Component Interconnect express) interface. Alternatively, or additionally, an USB (Universal Serial Bus) or a HSI (High-Speed Synchronous) based high speed interface commonly used in consumer electronics could be provided. A power supply PS is also provided for powering the platform.

A module MO is provided which may be attached to the platform, for instance by soldering as a component on a PCB or removably fixed by means of a connector or socket. The module can also be connected to the platform via a high speed interface. The module may include a number of elements (u1 . . . uN) such as a GPS receiver, a GERAN/UTRAN transceiver/EUTRAN (2G, 3G, LTE), a IEEE 802.11a/b/g/h based transceiver, a IEEE 802.15.1-2002 based Bluetooth receiver, etc.

The platform includes an external interface, EX_INT, over which radio parameters can be acquired under test with the various emulators to the testing apparatus TD. For evaluation the platform may placed in radio reverberation/anechoic test chamber where the platform is evaluated using e.g. a standard base station emulator BS_E, a Wireless LAN emulator WLAN_E and a positioning system emulator, GSSN_E. GNSS is a collective abbreviation for GPS, GLONASS, Galileo and CNSS, positioning systems.

Figure 2:
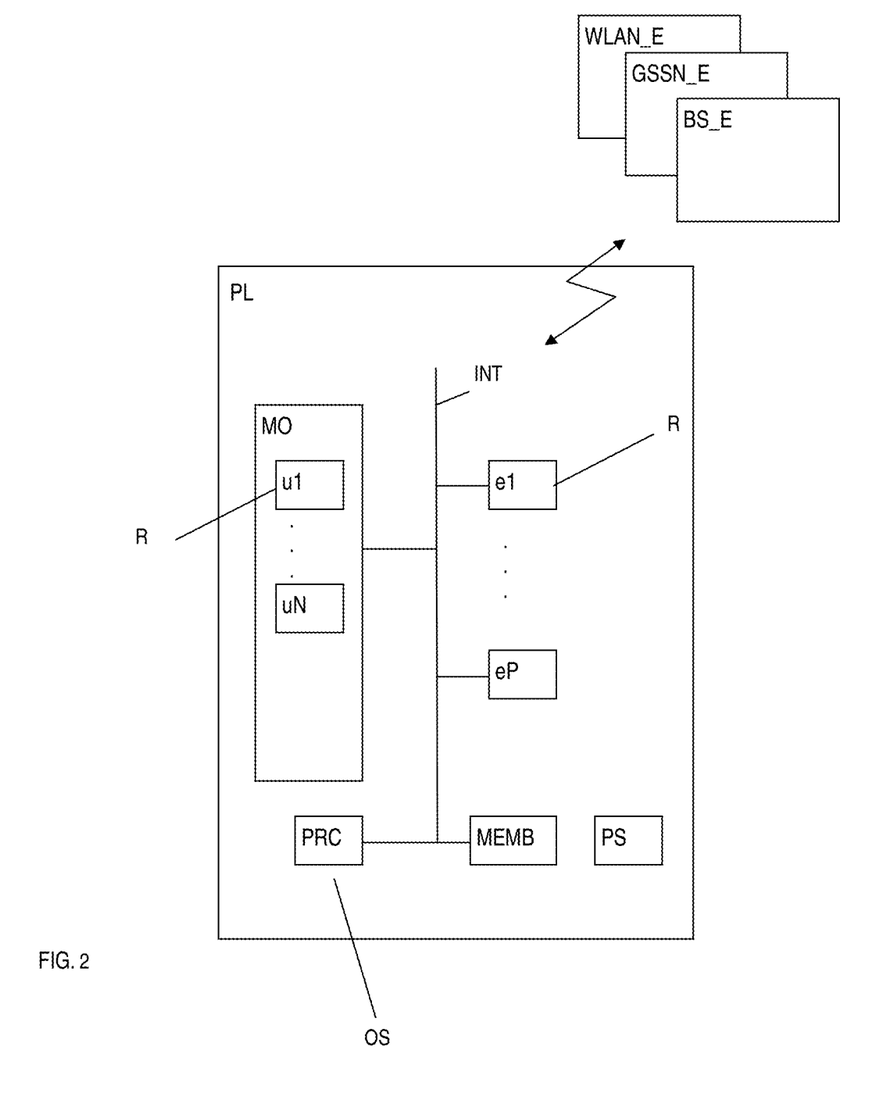
FIG. 2 shows an apparatus for performing RFI testing according to the invention.

In FIG. 2, another exemplary apparatus for which the first embodiment of the evaluation method of the invention may be used. The same reference signs denote the same functions in the figures. The apparatus of FIG. 2 includes the same means as explained with regard to FIG. 1, but an external interface is not necessarily provided.

Embodiments of methods according to the invention may advantageously be used for the apparatus shown in FIG. 2. In this connection, the same exemplary emulating means and the same reverberation/anechoic environment as explained for FIG. 1 may be used for the evaluation.

As will be understood from the above, the various elements will function according to driver routines that are running on an operative system, OS, running in the processor PRC. The provision of the elements and the state of the driver routines may appear to the operating system, OS, for instance as a list of hardware elements. The OS may furthermore be able to turn on/turn off individual elements and driver routines.

In the following description, the notion disabling an element may mean that power supply has been cut off from the element. It may also mean that that power has been substantially removed from the element, e.g. for adopting a sleep state of the element. Enabling an element may be construed such that an element is turned on and is operative. If an element is a transmitter, enabling an element may be construed so as to transmit at a maximum power.

Figure 5:
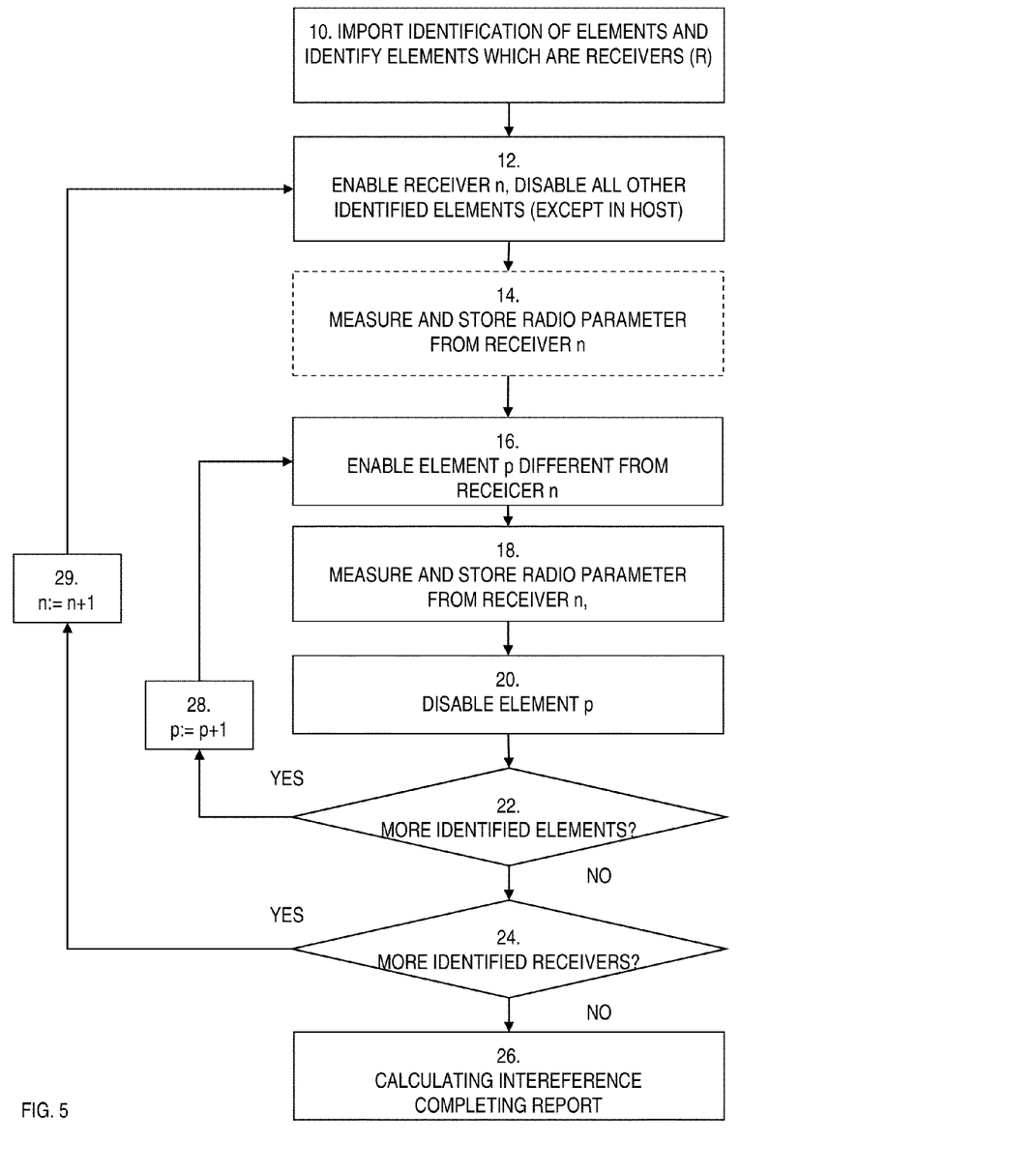
FIG. 5 shows a flow diagram for a method according to an embodiment of the invention.

In FIG. 5, a first embodiment of an evaluation method according to the invention is shown.

Figure 3:
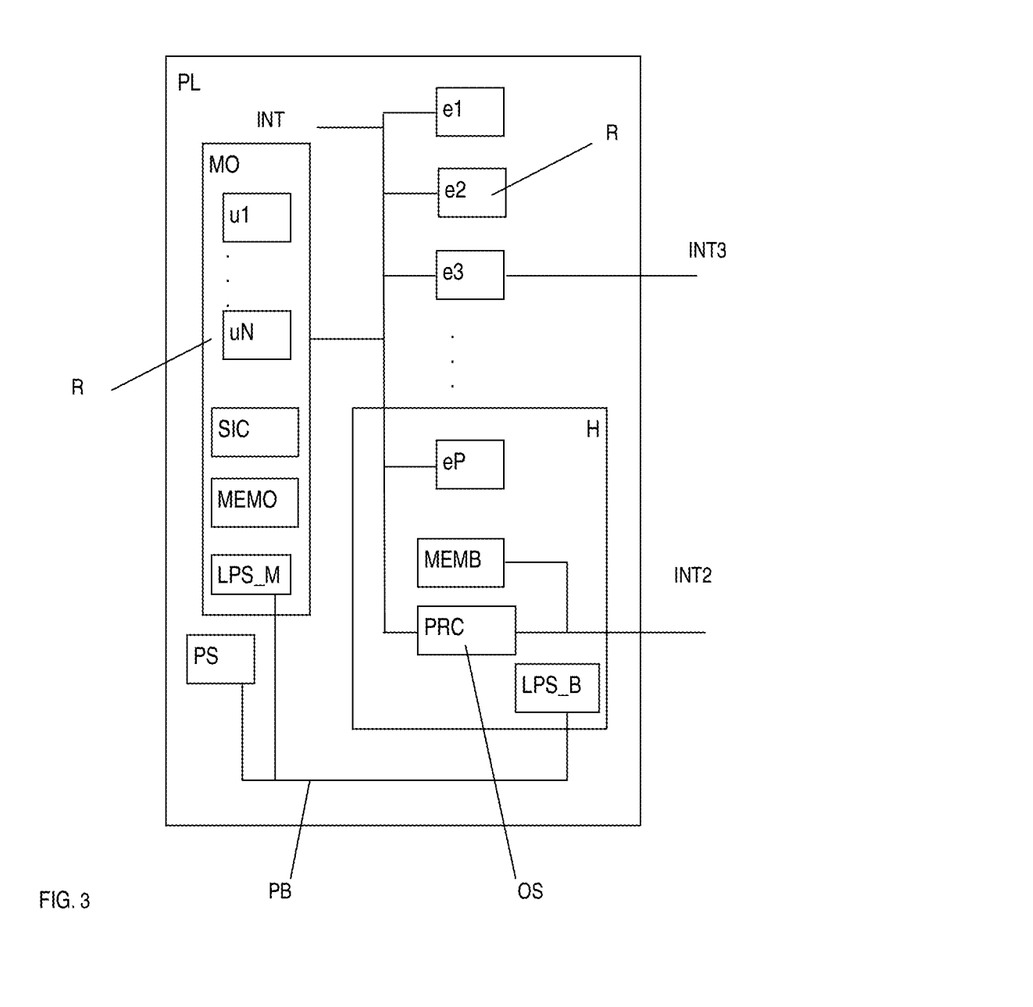
FIG. 3 shows an embodiment of an apparatus for performing RFI testing according to an aspect of the invention.

The evaluation method shown in FIG. 5 can be performed in the apparatuses shown in FIGS. 1, 2 and 3. The method of evaluation shown in FIG. 6 which is a further embodiment of the invention and which should be read in conjunction with FIG. 5 can be performed on the apparatus shown in FIG. 3.

However before turning to the methods of FIGS. 5 and 6, some aspects will be explained.

Hardware identification, hereunder radio transmitter/receiver identification

For typical known personal computers (PC—e.g. desktop, notebook, netbook, tablet) it is possible to extract information about the hardware, HW, configuration in terms of present devices and elements, hereunder radio elements.

Several radio systems, such as GPS (Global Positioning System), Wi-Fi, Bluetooth and FM radio are often integrated in one circuit mounted on the host. These devices will be handled and identified by the BIOS (basic input/output system). The BIOS will subsequent to booting up the operating system, OS, report hardware, HW, configuration to the OS. It is then possible to read out the HW configuration through API or file system, similar to opening the device manager in Windows or read files in/proc catalogue.

Devices connected to PCI or USB will be handled by respective bus by the host. The host will then report HW configuration to the operating system OS. According to the invention, a computer program product identifies all elements, including radio elements, of interest in the platform. The identification may be performed by the BIOS and the operating system OS is executing the task. The computer program product is fetching information about available elements.

Radio Parameters

The carrier signal is assumed to be constant in a free space configuration as line-of-sight between UE and base station. To achieve high accuracy the measurement should be performance in a shielded environment an anechoic chamber or a reverberation chamber should be used.

It is also possible to measure RSSI (relative received signal strength) and SNR (Signal to Noise Ratio) conducted via a coaxial cable. In this case the antennas characteristics and RF interference contribution is excluded. Moreover, RFI contribution coming from internal leakage will be included in the measurement. Normally, it is of interest to perform the measurements with antennas connected including antenna coupling.

According to an aspect of the invention, Eb/No or C/No may be used while keeping the carrier signal constant. In a conventional radio receiver several SNR values may be defined such as Ec/No, Es/No, Eb/No and C/No. Eb/No is the Energy per bit to Noise density ratio. Often used by WCDMA receiver. C/No is the Carrier power to noise density ratio, often used by GPS receivers. Ec/No is the Energy per chip to noise density ratio. Es/No is the Energy per symbol to Noise density ratio. Such definitions are typically provided by standardization bodies, and according to the invention such standardized parameters—but also non-standardized parameters—may advantageously be used.

If the reference signal is constant, a change in SNR is due to a change in received noise level. Since the internal noise is constant and is only dependent on temperature, external noise will affect the SNR. If the temperature is assumed constant or controlled to be constant, the received noise can hence be estimated.

It is noted that in a conventional receivers, the SNR is estimated by calculating BER (Bit Error Rate) based on a known bit pattern. Analytic approximations for different modulations can then be used to translate BER to SNR. This is advantageously used in the present invention when performing measurements. The emulators shown in FIG. 1 are used to establish BER values for receivers/transmitters of the apparatus being tested.

Eb/No is a signal-to-noise ratio is defined as the energy per bit to noise spectrum density. This is a parameter related to bit error rate of a digital transmission link. Eb/No is normally calculated by the detector in the receiver from a correlation or from a BER estimate Eb/No.

The Received Signal Strength Indicator (RSSI) is the total received noise power within the receiver bandwidth. RSSI will not discriminate between noise or signal. The RSSI measures per definition the received signal at the antenna reference point. The received signal power within the bandwidth is added together without knowledge of its signal or noise.

Eb/No or C/No is available for digitally modulated radio receivers such as GNSS, GSM, WCDMA (Wideband Code Division Multiplex Access) and LTE (Long Term Evolution). For GPS as part of GNSS the received signal strength is below thermal noise level. It will thus not make sense to define RSSI for GPS. The signal is extracted by de-spreading processing. Then the bit error rate, BER is estimated and transformed into C/No. For GPS the RSSI is related to C/No by the following formula: $P_{rx}=C/No+kTF$, which will be explained further in the following. RSSI and BER are available for WCDMA and LTE.

Figure 6:
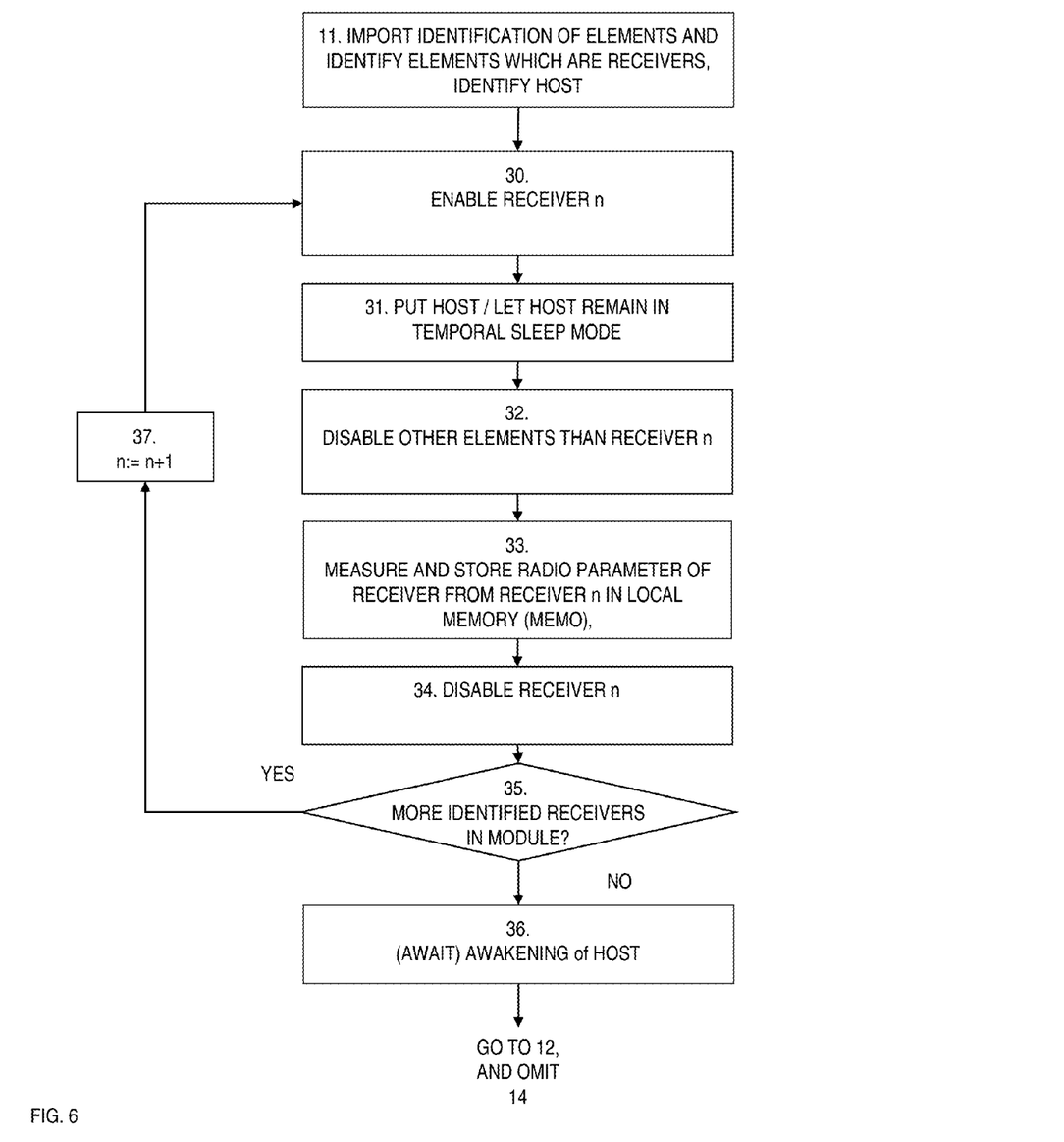
FIG. 6 shows a flow diagram for a method according to a further aspect of the embodiment of the invention for use e.g. on the apparatus of FIG. 3.

Insofar an element constitute a radio transmitter, such an element is advantageously made to transmit using its maximum output power, when enabled—(c.f steps 15 and 26—under the methods shown in FIGS. 5 and 6).

Relation between signal to noise ration SNR and interference noise level $N_I$

The SNR at the detector in a typical receiver is defined as:

$$SNR = \frac{P_{rx}}{kTBF + N_I} \qquad (I)$$

where kT is the thermal noise in Ws, F is the receiver noise figure, B is the bandwidth in MHz and NI is the interference noise level W.

Figure 4:
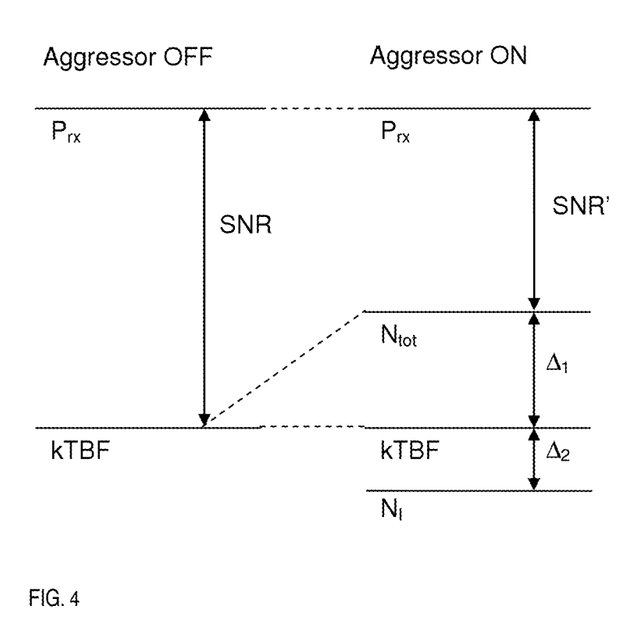
FIG. 4 shows a relation between the signal to noise ratio SNR and interference noise level $N_I$.

FIG. 4 shows a relation between the signal to noise ration SNR and interference noise level $N_I$, for a situation for a "victim" receiver and an "aggressor" element—i.e. an element which may cause interference. To the left, the situation is shown where the aggressor element is turned on and to the right the aggressor element is turned off.

According to the invention, elements are enabled (turned on) and disabled (turned off) in sequence. During the sequencing, for instance the receiver output SNR value is sampled and stored. Assuming that the input reference signal level ($P_{rx}$) and the receiver noise level are constant, the detector SNR is a function of interference noise ($N_I$) introduced by an enabled element, e1-e2, u1-uN. The total noise at the victim receiver detector can be written as the sum of internal thermal noise and external RFI noise, according to following formula:

$$N_{tot}=kTBF+N_1 \qquad (II)$$

where kT is the thermal noise in W/Hz), F is the receiver noise figure in times, B is the bandwidth in Hz and $N_I$ is the interference noise level in W, K is Boltzmann constant, T is the temperature in Kelvin, F is the noise figure of the victim receiver used for SNR measurement. Typically, at room temperature kT is estimated to be −174 dBm/Hz.

Assuming that the reference signal is constant, the difference in measured SNR—as to when the aggressor is on and off—only relate to the noise level. $\Delta_2$ is the difference between the interference level (Ni) and the thermal noise level (kTBF). $\Delta_1$ is the difference between the total noise level and the thermal noise level (kTBF).

$$\begin{cases} N_{tot} = kTBF + N_I \\ kTBF = \Delta_2 \cdot N_I \\ N_{tot} = \Delta_1 \cdot kTBF \end{cases} \Rightarrow \Delta_2 = \frac{1}{\Delta_1 - 1} \quad \text{(III)}$$

Figure 8:
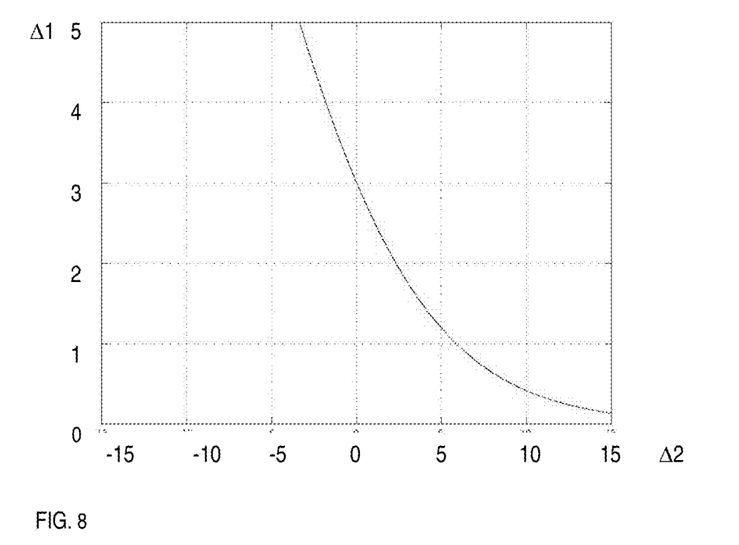
FIG. 8 shows a relation between received noise changes appearing during an exemplary RFI evaluation according to the invention.

It can be seen that the self generated noise must be 10 dB under the thermal noise if the total noise shall be less than 0.5 dB over thermal noise floor. As seen in FIG. 8, when Δ2=0 the total noise is 3 dB higher than the receiver reference noise level. It can be seen that the self generated noise must be 10 dB under the thermal noise if the total noise shall be less than 0.5 dB over thermal noise floor.

With this knowledge, it is possible to estimate the absolute value of the self interference noise level:

$$SNR = \frac{P_{rx}}{kTBF} \quad \text{(IV)}$$

$$SNR' = \frac{P_{rx}}{N_{tot}} = \frac{P_{rx}}{kTBF + N_I} \quad \text{(V)}$$

$$\Delta_1 = \frac{SNR}{SNR'} = 1 + \frac{N_I}{kTBF}, \text{ hence} \quad \text{(VI)}$$

$$N_I = kTBF\left(\frac{SNR}{SNR'} - 1\right) = P_{rx}\left(\frac{1}{SNR'} - \frac{1}{SNR}\right) \quad \text{(VII)}$$

In a test environment, such as an anechoic chamber, the output power $P_{rx}$ can be held constant and measured. The respective signal to noise ratios SNR and SNR' for an aggressor element being turned off and turned on—while substantially all other elements are tuned off—are resolved for instance from measured BER values. This estimate is preferably provided in steps 14/18/33 —explained below—for completing a report according to an embodiment of the invention.

Method of First Embodiment of the Invention

In FIG. 5 a first embodiment of the method according to the invention is shown. This embodiment may pertain to the apparatuses shown in FIGS. 2 and 3.

In step 10, an identification of elements is done. Moreover it identified which elements are receivers (R). In step 12,—in a first subroutine, see index n step 29—a first receiver (n) is enabled while all other identified elements are disabled. In step 14, a radio parameter measurement is performed by means of receiver (n) and stored. Subsequently—in a second sub-routine index p step 28—an element p different from the enabled receiver is also enabled and step 18 a radio parameter is measured and stored. Then the element in question is disabled step 20, and the second subroutine continues for other elements according to step 22: more identified elements? Also the remaining receivers are made subject to the measurements according to the first subroutine, according step 24: More identified receivers? Lastly, in step 26, the interference—e.g. the interference noise level $N_I$ is calculated and an automated report is completed, step 26.

In other words there is provided, a method for testing radio properties of at least a module MO in a platform P, wherein, the module includes one or more elements u1; uN and the platform includes one or more elements e1; eP, wherein an element may include a receiver, each element potentially being susceptible to interference from the one or more other elements. The method includes the steps of importing 10 an identification of a plurality of elements e1-eP; u1-uN and an identification of elements which have receivers R which are capable of measuring and communicating radio parameters;

wherein for each n identified receiver R, enabling 12 the receiver R performing and storing 14 a radio parameter measurement in which other identified elements are disabled 12 for a reference level measurement $N_{REF}$; and wherein for each other identified element different from the identified receiver, performing and storing 18 a further radio parameter measurement for which the other element different from the identified receiver is enabled 16 for a disturbance level measurement of the given other enabled element with respect to the identified enabled receiver.

Preferably, substantially all identified receivers R are evaluated 29 with regard to interference from elements 28 different from the respective receiver R under evaluation. However, this may not always be possible. For instance, it may not be possible turn off some core elements in the apparatus in FIG. 1.

According to one aspect the method includes the step of calculating interferences 26, wherein for each receiver R a reference level measurement and a disturbance level measurement are compared with another for providing an interference noise level N(i).

Moreover, according to step 26—a report 26 is completed wherein the interference noise level N(i) for an enabled receiver in relation to an enabled element is compared with a predetermined threshold value $N_{THR}$ and wherein an indication whether the predetermined threshold is exceeded is provided.

As is shown in FIGS. 2 and 3 the platform further includes a processor PRC. The method according to a further aspect of the invention may be formed as an instruction set adapted to be saved in memory MEMB for running under an operating system OS on the processor PRC.

A basic input/output system, BIOS, may also be provided for the processor PRC, wherein subsequent to a booting up of the operating system OS, the method further performs the steps of reporting a hardware configuration by the BIOS to the operating system OS comprising the identification 10 of elements and the identification of elements which are receivers, reading out the hardware configuration through an application programming interface, API, or file system to the instruction set carrying out the method, such as to allow the importing 10, 11 of the identification of elements u1 . . . uN; e1 . . . eP and the identification of elements.

Hence, this aspect of the invention allows for an automated process on a variety of different platforms having various unknown elements, including various receivers, such elements moreover being provided in a variety of different combinations.

This may for instance be of relevance for typical laptop manufactures which make use of a variety of "of the shelves" components which may be offered in a variety of combinations in the product offered to customers.

The method according to one embodiment may further include the identification 10 of elements further includes an identification of transmitters. If an element is transmitter, when enabled 15—it is provided that it is transmitting at a maximum level.

Preferably, but not exclusively, standardized radio parameters may be used for the evaluation. For instance, the measured radio parameter Eb/No which is a signal-to-noise ratio representing the energy per bit to noise spectrum density and/or a received signal strength indicator RSSI representing the total received noise power within a receiver bandwidth may be used as a parameter.

Figure 7:
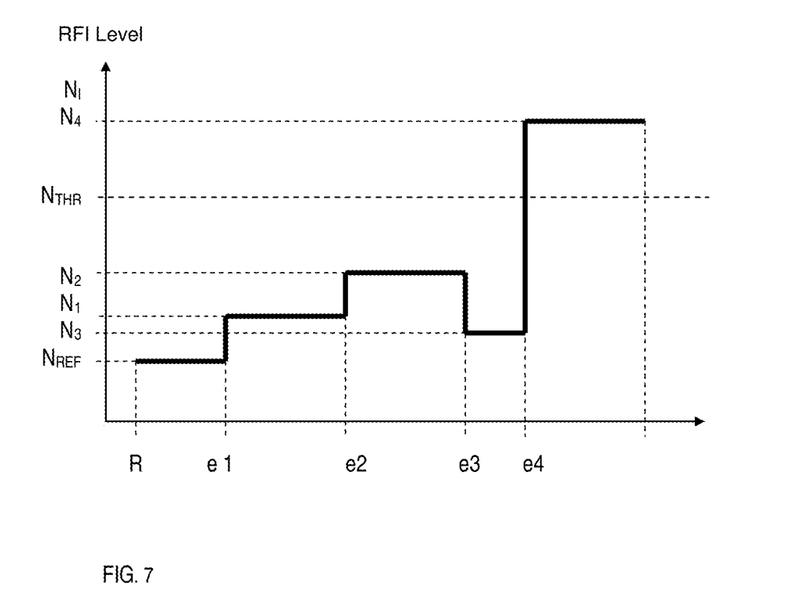
FIG. 7 shows the outcome of an exemplary test scenario.

In FIG. 7, an exemplary outcome of one embodiment of the method according to the invention is shown. In FIG. 7, part of the report for one receiver is provided, whereby the noise impact of respective elements are depicted N(1)-N(4). The noise floor with only receiver enabled and substantially all other elements being disabled is shown, as indicated by reference sign R. For instance, the noise level of aggressor 4 with respect to the given victim receiver has reached an unacceptable level, $N_{THR}$.

The method may be implemented as a computer program product for testing radio properties of a radio module MO in a platform PL having a processor PRC, wherein, the module includes a plurality of elements u1; uN, and the platform includes one or more elements e1; eP, wherein a given element may include a receiver, which are potentially susceptible to interference from the one or more other elements.

Hence, the computer program product IS is adapted to carry out the steps of:

importing 10 an identification of a plurality of elements e1-eP; u1-uN and an identification of elements which have receivers R which are capable of measuring and communicating radio parameters;

wherein for each n identified receiver R, enabling 12 the receiver R performing and storing 14 a radio parameter measurement in which other identified elements are disabled 12 for a reference level measurement $N_{REF}$; and wherein for each other identified element different from the identified receiver, performing and storing 18 a further radio parameter measurement for which the other element different from the identified receiver is enabled 16 for a disturbance level measurement of the given other enabled element with respect to the identified enabled receiver.

Moreover, n all identified receivers R may be evaluated 29 with regard to interference from elements 28 different from the respective receiver R under evaluation.

The platform may include a processor PRC, and the computer program product may consequently be formed as an instruction set adapted to be saved in memory MEMB for running under an operating system OS on the processor PRC.

A basic input/output system. BIOS, is provided for the processor PRC, wherein subsequent to a booting up of the operating system OS, the computer program product further being adapted to further perform the steps of reporting a hardware configuration by the BIOS to the operating system OS comprising the identification 10 of elements and the identification of elements which are receivers, reading out the hardware configuration through an application programming interface, API, or file system to the instruction set carrying out the method, such as to allow the importing 10, 11 of the identification of elements u1 . . . uN; e1 . . . eP and the identification of elements.

Host in Sleep Mode—Second Embodiment

In FIG. 3, an exemplary platform according to aspects of the invention is shown for which a second embodiment may be utilized. This apparatus includes the same means as explained with regard to FIG. 2, but again, an external interface is not necessarily provided and additional means are provided.

Hence, a platform PL is provided which includes a host H—which could be implemented as a motherboard—a plurality of elements, e1-e3, and an internal interface INT, connecting the elements and the host. The host also includes an element eP, a memory MEMB and a processor PRC. The host may be a printed circuit board, PCB. The interface may be a PCIe (Peripheral Component Interconnect express interface.

The processor PRC may be a standard microprocessor and the memory MEMB may be a non-volatile memory such as a random access memory, MEMB, e.g. a solid state disk SSD. An operative system, OS, is installed on the processor for operating the platform and running computational tasks.

A second interface, INT2, such as a SATA- or PCI-express interface, connects the processor PRC and the memory, MEMB. The second interface may provide external access.

The elements may constitute elements such as, Ethernet interface, USB-, HDMI-interface, Firewire IEEE 1394, INT3, display (e.g. LCD or LED), display driver logic and graphical processor unit, keyboard, loudspeaker, microphone, 3-D Accelerometer and gyroscope, FLASH RAM interface etc.

One or more of the elements, may be constituted by a module MO which may be attached to the platform, for instance by soldering as a component on a PCB or removably fixed by means of a connector or socket as explained above.

The module may include a number of elements such as GPS receiver, GERAN/UTRAN transceiver (2G, 3G, LTE), Wi-Fi transceiver, Bluetooth receiver, etc. Some of these elements may include radio transmitters, R.

The module MO may be adapted for being inserted in the platform and at least temporarily storing measurement results and co-operating with the method being implemented on the host or the computer program product running on the operative system of the host. For this reason, according to a further aspect of the invention, the module may include a non-volatile memory MEMO.

The module M has a self interference controller SIC, the self interference controller being adapted to carry out specific measurements performed by the own receivers of the module.

A power supply PS is provided supplying the platform, possibly including the module. An additional local power supply LPS_M is provided in the module MO for powering this without support from the power supply. Moreover, the host H may include a local power supply, LPS_B. Local power supplies are known from devices which incorporate wake on wireless, anti-theft and location based service functions.

The SIC is enabled by sending a test stimuli to the module, the test stimuli could be an AT command or API call. The test stimuli could be an ASCII based AT-command, Binary command or a physical signal. For the notebook case, the SIC can command the host to go to sleep, resume, turn on/off display, shutdown hard drive and manipulate other modules, such as WLAN and Bluetooth via the radio management functionality available in the OS.

The notion power supply may include batteries and voltage regulating means, such as DC/DC power converters. The host H may be put in a sleep mode in which power is reduced such that all elements of the module may be virtually shut off. The local power supply LPS_B will enable that the host can be awakened from the sleep mode. The module MO is supplied with local power LPS_M. This enables the module and its elements to operate, despite the rest of the platform being turned off, or virtually being put to sleep in a sleep mode in which elements are powered off.

According to a further aspect of the invention as shown in FIG. 3, the module may include a non-volatile memory MEMO. To store data according to specific embodiments of the invention, the host is turned off. In this case, the power rail (not shown) feeding a respective radio receiver R element in the module MO is still activated, through local power supply LPS_M.

For exemplary types of notebooks and smart-phones, the WWAN radio must be able to react on RAN activities when the host is in sleep mode (e.g. receiving SMS, cell change, Location requests).

According to an aspect of the invention, the host H will initiate an internal measurement to be done by the module MO in which the host H is putting itself in sleep mode. The self interference controller SIC in the module MO is adapted to perform measurements for all radio elements onboard the module MO, while the host adapts the sleep mode and while the module is storing the results in its non-volatile memory MEMO. Subsequently, the module may wake up the host H via the communication bus, INT. Alternatively, an external signal may wake up the host.

It is noted that as long as the host can be set to operate in sleep mode, which many standard PC's are capable of, reference measurements can be made which reflect true values more accurately.

In this scenario when no aggressor radio transmitter or other element is enabled, the baseline performance of the victim receiver is measured. This measurement shall be referred to as the "reference measurement".

In FIG. 6, further features of a second embodiment of an evaluation method according to the invention are shown. FIG. 6 shows additional steps which are undertaken to most of the steps shown in FIG. 5, more specifically, the steps of FIG. 5 are initially carried out, whereupon the method goes to step 12 of FIG. 5, not performing step 10 and 14.

In FIG. 6, step 11, identification is made of all elements and elements which are receivers. In step 30, one of a given identified receiver is enabled. Subsequently, in step 31 the host H is put in a temporal sleeping mode. The elements of the host, such as the processor PRC, are thereby not producing any interference. Then, in step 32 all other elements are disabled and radio parameters from receiver n is performed and stored in local memory MEMO. After measurement, the receiver is disabled, and a subroutine 37, c.f. index n, repeats the process for all receivers. Since the host is adopting a sleeping mode receivers of the host are not evaluated while carrying out this process. In such a case, a further embodiment may involve that step 14 is not omitted.

Hence, in addition to the steps explained with reference to FIG. 5, there is provided a method comprising the steps of
further identifying a host 11 supporting the processor PRC and the memory MEMB in which the instruction set is stored;
enabling 30 a receiver in the module MO;
putting 31 the host in sleep mode;
disabling 32 other identified elements than the enabled receiver;
measuring and storing 33 a radio parameter of the receiver in a local memory LPS_M associated with the receiver or with a module supporting the receiver for a reference measurement $N_{REF}$ pertaining to the enabled receiver.

Again, according to a further aspect of the invention, the above steps may be implemented as a computer program product which may be downloaded to the very platform being subject for the method of testing radio properties.

Module According to the Invention

Aspects of the computer program product explained above may alternatively be provided as a module M for a platform comprising a plurality of elements of which at least one element is a receiver R. Hence, such a module is being adapted for being inserted in a platform PL. The module M comprising a local memory MEMO and a local power supply LPS_M and a self interference controller SIC, the self interference controller being adapted to
identifying a host 11 supporting the processor PRC and the memory MEMB in which the instruction set is stored;
enabling 30 a receiver in the module MO;
putting 31 the host in sleep mode;
disabling 32 other identified elements than the enabled receiver;
measuring and storing 33 a radio parameter of the receiver in a local memory LPS_M associated with the receiver or with a module supporting the receiver for a reference measurement $N_{REF}$ pertaining to the enabled receiver.

Advantages

According to the invention, there is provided an automated method for RFI evaluation of a multi radio device. The input needed from each receiver is identified and radio parameters are detected. For instance SNR measurements are performed while an output signal is generated from an enabled transmitter or noise generating component. The testing is preferably embedded into the system and could be performed in a test environment with a reference signal generator constituted by an embedded element. After the test is initiated in the module, it will report back the status for a specific receiver.

The invention provides for a cost and time efficient way of estimating in-band self interference.

The measurement report may be arranged in the form of a matrix of data for all radio receivers in an apparatus. The data could be used to confirm that performance requirement is fulfilled. Data could also be used speed up OTA TRS (Over The Air Total Radiated Sensitivity) measurement.

If the self-interference is evaluated for an apparatus according to the methods of the invention and possibly also for the apparatus of the invention, TRS could be derived from passive antenna efficiency measurements. This will reduce the time needed for OTA performance measurements.

The information could be used by the OS to decide which combination of radio elements are allowed to be enabled simultaneously by the user when using the apparatus.

What is claimed is:

1. A method for testing radio properties of at least a module (MO) in a platform (P), the module and the platform having a plurality of elements in which at least one element has a receiver, each element potentially being susceptible to interference from the other ones of the plurality of elements, the method comprising:
importing (10) an identification of the plurality of elements (e1-eP; u1-uN); and
identifying each of the plurality of elements based at least in part on the imported identification of the plurality of elements, the identifying of the plurality of elements including identifying which elements have at least one receiver (R) capable of measuring and communicating radio parameters;
for each (n) identified receiver (R):
enabling (12) the identified receiver (R);
disabling the other identified plurality of elements by substantially removing power from the other identified plurality of elements; and performing a first radio parameter measurement when the identified receiver (R) is enabled and the other plurality of elements are disabled for a reference level measurement ($N_{REF}$);

storing the first radio parameter measurement; and for each of the other plurality of elements different from the identified receiver (R):

enabling the other identified plurality of elements one at a time;

performing a second radio parameter measurement when only a selected one of the other identified plurality of elements is enabled and the identified receiver (R) is enabled for a disturbance level measurement of the selected one of the other identified plurality of enabled elements with respect to the identified enabled receiver (R); and storing the second radio parameter.

2. The method according to claim 1, wherein each identified receiver (R) is evaluated (29) with regard to interference from receivers different from the respective identified receiver (R) under evaluation.

3. The method according to claim 1, further comprising calculating interferences (26), the calculating interferences including, for each identified receiver (R), a reference level measurement and a disturbance level measurement are compared with each other to provide an interference noise level (N(i)).

4. The method according to claim 3, further comprising:

comparing the interference noise level (N(i)) for an enabled identified receiver in relation to an enabled identified element with a predetermined threshold value ($N_{THR}$); and providing an indication whether the predetermined threshold is exceeded.

5. The method according to claim 1 wherein, the platform further comprises a processor (PRC), the method being formed as an instruction set adapted to be saved in memory (MEMB) for running under an operating system (OS) on the processor (PRC).

6. The method according to claim 5 wherein a basic input/output system, BIOS, is provided for the processor (PRC), wherein subsequent to a booting up of the operating system (OS), the method further includes:

reporting a hardware configuration by the BIOS to the operating system (OS) comprising the identification (10) of the plurality elements including which are receivers; and reading out the hardware configuration through one of an application programming interface, API, and file system to the instruction set carrying out the method, such as to allow the importing (10, 11) of the identification of the_plurality of elements (u1. .uN; e1 . . . eP).

7. The method according to claim 5, further comprising:

identifying a host (11) supporting the processor (PRC) and the memory (MEMB) in which the instruction set is stored;

enabling (30) a receiver in the module (MO);

putting (31) the host in sleep mode;

disabling (32) other identified plurality of elements than the enabled receiver; and measuring and storing (33) a radio parameter of the enabled receiver in a local memory (LPS_M) associated with one of the enabled receiver and a module supporting the receiver for a reference measurement ($N_{REF}$) pertaining to the enabled receiver.

8. The method according to claim 1, wherein the identification (10) of elements further comprises:

identifying transmitters, and if an element is identified as a transmitter, transmitting at a maximum level when the transmitter is enabled.

9. The method according to claim 1, wherein the measured radio parameter (Eb/No) is at least one of a signal-to-noise ratio representing energy per bit to noise spectrum density and a received signal strength indicator (RSSI) representing a total received noise power within a receiver bandwidth.

10. The method of claim 1, wherein the module and the platform are tested in one of an anechoic chamber and a reverberation chamber.

11. The method of claim 1, wherein the testing is performed using at least one of a base station emulator, a wireless local area network emulator and a positioning system emulator.

12. The method of claim 1, further comprising comparing reference level measurements for a plurality of the identified receivers.

13. A non-transitory processor-readable storage medium storing instructions for execution to test radio properties of a radio module (MO) in a platform (PL) having a processor (PRC), the module and the platform comprising a plurality of elements, at least one of the plurality of elements having a receiver that is potentially susceptible to interference from the other ones of the plurality of elements, the instructions when executed being configured to:

import (10) an identification of the plurality of elements (e1-eP; u1-uN); and identify each of the plurality of elements based at least in part on the imported identification of the plurality of elements, the identifying of the plurality of elements including identifying which elements have at least one receiver (R) capable of measuring and communicating radio parameters;

for each (n) identified receiver (R):

enable (12) the receiver (R);

disable the other identified plurality of elements by substantially removing power from the other identified plurality of elements; and perform a first radio parameter measurement when the identified receiver (R) is enabled and the other plurality of elements are disabled for a reference level measurement ($N_{REF}$);

store the first radio parameter measurement; and for each of the other plurality of elements different from the identified receiver (R):

enable the other identified plurality of elements one at a time;

perform a second radio parameter measurement when only a selected one of the other identified plurality of elements is enabled and the identified receiver (R) is enabled for a disturbance level measurement of the selected one of the other identified plurality of enabled elements with respect to the identified enabled receiver (R); and store the second radio parameter.

14. The non-transitory processor-readable storage medium according to claim 13, wherein each identified receiver (R) is evaluated (29) with regard to interference from receivers different from the respective identified receiver (R) under evaluation.

15. The non-transitory processor-readable storage medium according to claim 13, wherein the instructions when executed are further configured to carry out the step of calculating interferences (26), the calculating interferences including, for each identified receiver (R), a reference level measurement and a disturbance level measurement are compared with each other to provide an interference noise level (N(i)).

16. The non-transitory processor-readable storage medium according to claim 13, wherein the instructions are configured to execute under an operating system (OS) on the processor (PRC).

17. The non-transitory processor-readable storage medium according to claim 13, wherein a basic input/output system, BIOS, is provided for the processor (PRC), and wherein subsequent to a booting up of the operating system (OS), the instructions being configured to:
  report a hardware configuration by the BIOS to the operating system (OS) comprising the identification (10) of the plurality of elements including which are receivers; and
  read out the hardware configuration through one of an application programming interface, API, and file system to the instruction set carrying out the method, such as to allow the importing (10, 11) of the identification of the_plurality of elements (u1 . . . uN; e1 . . . ep).

18. The non-transitory processor-readable storage medium according to claim 13, wherein the instructions when executed are further configured to:
  identify a host (11) supporting the processor (PRC) and the non-transitory processor-readable storage medium (MEMB) in which the instruction set is stored;
  enable (30) a receiver in the module (MO);
  put (31) the host in sleep mode;
  disable (32) other identified plurality of elements than the enabled receiver; and
  measure and store (33) a radio parameter of the enabled receiver in a local memory (LPS_M) associated with one of the enabled receiver and a module supporting the enabled receiver for a reference measurement ($N_{REF}$) pertaining to the enabled receiver, the measuring of the radio parameter of the enabled receiver occurring while the host is in sleep mode.

19. The non-transitory processor-readable storage medium according to claim 13, wherein the instructions when executed are further configured to:
  compare the interference level (N(i)) for identified receiver in relation to an identified element with a predetermined threshold value ($N_{THR}$); and
  provide an indication whether the predetermined threshold is exceeded.

20. The non-transitory processor-readable storage medium according to claim 13, wherein the identification of elements further comprises an identification of transmitters, and if an element is identified as a transmitter, transmitting at a maximum level when the transmitter is enabled.

21. The non-transitory processor-readable storage medium according to claim 13, wherein the measured radio parameter (Eb/No) is at least one of a signal-to-noise ratio representing an energy per bit to noise spectrum density and a received signal strength indicator (RSSI) representing a total received noise power within a receiver bandwidth.

* * * * *